US006972862B2

(12) United States Patent
Tang et al.

(10) Patent No.: US 6,972,862 B2
(45) Date of Patent: Dec. 6, 2005

(54) PORTABLE FAX MACHINE

(75) Inventors: Donald T. Tang, Mt. Kisco, NY (US);
Hui Su, Beijing (CN); Qian Ying Wang, Beijing (CN)

(73) Assignee: International Business Machines Corp., Armonk, NY (US)

( * ) Notice: Subject to any disclaimer, the term of this patent is extended or adjusted under 35 U.S.C. 154(b) by 817 days.

(21) Appl. No.: 09/681,788

(22) Filed: Jun. 5, 2001

(65) Prior Publication Data

US 2002/0048047 A1   Apr. 25, 2002

(30) Foreign Application Priority Data

Dec. 7, 1998   (CN) .................................. 98123077
Nov. 26, 1999  (GB) ..................... PCT/GB99/03939

(51) Int. Cl.[7] ............................ G06K 1/00; H04N 1/00
(52) U.S. Cl. ..................................... 358/1.15; 358/401
(58) Field of Search ............................... 358/400, 401,
358/402, 403, 404, 405, 407; 382/313, 317,
382/321; 178/18.03, 18.06, 19.01, 19.03;
345/173, 179; 455/500

(56) References Cited

U.S. PATENT DOCUMENTS

| 5,133,076 A | | 7/1992 | Hawkins et al. ............. 395/800 |
|---|---|---|---|
| 5,153,744 A | * | 10/1992 | Nobuta ........................ 358/400 |
| 5,619,684 A | | 4/1997 | Goodwin et al. ............ 395/500 |
| 5,742,894 A | | 4/1998 | Jambhekar et al. ............ 455/90 |
| 5,832,113 A | | 11/1998 | Sano ............................ 382/187 |
| 5,959,260 A | * | 9/1999 | Hoghooghi et al. ....... 178/18.03 |

FOREIGN PATENT DOCUMENTS

| CN | 119144 A | 8/1998 | .......... H04N 1/028 |
|---|---|---|---|
| EP | 2129511 | 8/1998 | |
| GB | 2289555 | 11/1995 | |
| GB | 2308523 | 6/1997 | .......... H04M 11/06 |
| GB | 2308523 A | * 6/1997 | .......... H04M 11/06 |
| JP | 08-030443 | 2/1996 | |
| JP | 10-112765 | 4/1998 | |
| JP | 10-134003 | 5/1998 | |
| JP | 10-243152 | 9/1998 | |

OTHER PUBLICATIONS

International Search Report PCT/GB 99/ 03939; Nov. 26, 1999.
Abstract of CN1191441A: Pen Drawing Input Telefacsimile Machine.

* cited by examiner

Primary Examiner—Kimberly Williams
Assistant Examiner—Charlotte M. Baker
(74) Attorney, Agent, or Firm—Law Office of Charles W. Peterson, Jr.

(57) ABSTRACT

A portable fax machine includes a pen-based input device, having a writing pen and a writing pad, enabling a user to write documents for fax transmission on the writing pad by means of the writing pen. The input device is capable of generating data representative of the moving trace of the writing pen. An encoder transfers the data representative of the moving trace of the writing pen into fax data format. A dialer inputs the fax number of a destination to set up a connection. A fax transmission device transmits to the destination the data in the fax data format output by the encoder.

7 Claims, 9 Drawing Sheets

PORTABLE FAX MACHINE

BACKGROUND OF INVENTION

1. Field of Invention

The present invention relates to a portable fax machine, particularly to the portable fax machine with a pen-based input device.

2. Background

In our daily life and work, fax machines are common telecommunication instruments for transmitting and receiving long distance static images, forms and documents by way of wire or wireless transmission mode. At the transmitting terminal, the transmitters of the fax machines scan the images and data, encode and convert the images and data into appropriate signal waves and then send them to receiver fax machines at a remote end via wire or wireless channels; at the receiving terminal, these signals are converted back so as to reproduce the original images on recording paper. The advantages of this kind of telecommunication instruments are that authentic images or characters can be transmitted and received. However, due to the restriction of volume and weight, known fax machines cannot be carried and lack portability.

With the quick development of computer software and hardware, some personal telecommunication instruments with small volume and light weight have emerged, such as IBM's SIMON (TM), which provides the function of cellular telephones, fax transmission and reception, e-mail transmission and reception, pagers and electronic notebooks. However, these personal telecommunication instruments use keyboards as the only input means. For those who are not familiar with keyboards and those who wish to keep the authentic handwritten form of a document, this is not a very good input mode. After these instruments are connected with external scanners, they can have the function of fax machines. However, in such cases, they then lack portability. Likewise, known personal telecommunication instruments taking digitizers as input means possess no portability. Furthermore, they are also not suitable for being used as general fax machines because of their complicated functions.

SUMMARY OF INVENTION

The present invention provides a portable fax machine, which can be manufactured to have a small volume and light weight, which enables a user to write documents to be transmitted in a traditional way.

A portable fax machine with a pen-based input device according to a first aspect of the present invention includes: a pen-based input device, having a writing pen and a writing pad, enabling a user to write documents for fax transmission on the writing pad by means of the writing pen, wherein the input device is capable of generating data representative of the moving trace of the input device; an encoder for transferring the data representative of the moving trace of the writing pen into fax data format; a dialer for inputting the fax number of a destination to set up a connection therewith; and a fax transmission device for transmitting to the destination the data in the fax data format output by the encoder.

Another feature of the present invention includes a dialing method for use in a portable fax machine, comprising the steps: selecting an area on a writing area of an input device as a dialing area; loading a program for defining the dialing area and processing the signal coming from the dialing area; triggering the program according to predetermined timing when a writing device contacts the dialing area.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

The invention including preferred embodiments and advantages thereof will be described below in detail, by way of example, with reference to the accompanying drawings.

DETAILED DESCRIPTION

Another aspect of the invention is to further improve the ease of use of portable fax machines.

In addition, the fax machine according to a preferred embodiment of the present invention provides a "paper dialing" function for users, which uses software enabling a dialing area to be defined or moved by a user such that the user can determine which region of the display area is most suitable for use as a dialing area.

Figure 1:
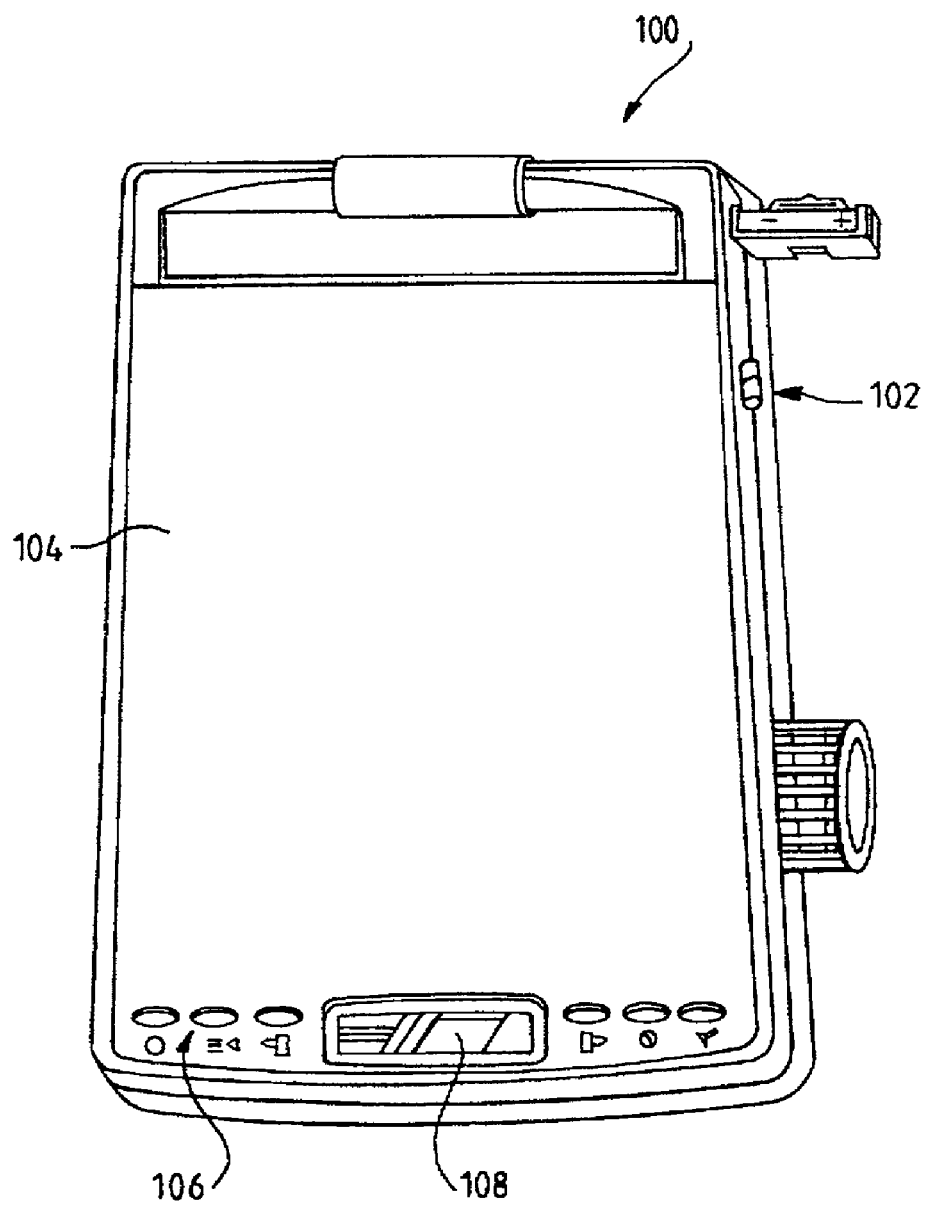
FIG. 1 is an overview diagram of a portable fax machine with a pen-based input device according to an embodiment of the invention.

As shown in FIG. 1, the portable fax machine with a pen-based input device 100 in accordance with the invention may include a housing 102 on which a digitization tablet 104 overlies. The digitization tablet 104 includes an active area capable of receiving electromagnetic signals from a radio frequency coupled stylus. In accordance with an embodiment of the present invention, the pen-based input device 100 of the portable fax machine is a device which integrates handwriting digitizer with a traditional paper-based recording making system, such as IBM's ThinkScribe. IBM's ThinkScribe is described in detail in U.S. patent application Ser. No. 08/747,735 (IBM docket Y0995203) which is incorporated herein by reference and by attachment.

In the illustrated embodiment, the active area of the digitization tablet has a form factor coinciding with that of a standard paper size (for example, A4 or A5 ). An user may write the documents to be transmitted on the digitization tablet or paper. The digitization tablet generates a data flow representative of strokes and the associated events, and records the data flow in a nonvolatile memory. The associated events in the data flow may be generally categorized as being either automatically generated by the input device or as being user invoked. Automatically generated events are events which occur and are detected and recorded without specific input from the user. For example, there may be defined a pen-down event which indicates that the stylus was brought into contact with the writing surface and a pen-up event which indicates that the stylus was lifted from the writing surface. A stroke may thus be defined as a series of pen coordinates recorded between a pen-down and a pen-up event There may further be defined "button" event, when the stylus contact with a button in a predefined area 106, as shown in the FIG. 1, the input device automatically generates a predefined event and performs the corresponding process, such as "new page", "page up", "page down". The events invoked by user may be the event identifying the particular page and the event describing the characterization of the particular strokes. The advantages of taking a device which integrates handwriting digitizer with a traditional paper-based recording making system as the input device of the portable fax machine of the present invention lie in: being suitable for those who are not familiar with keyboards and wish to keep the authentic handwriting forms. Particularly, such an input device may be used as a notebook, which can transmit the meeting records as the fax documents.

Figure 2:
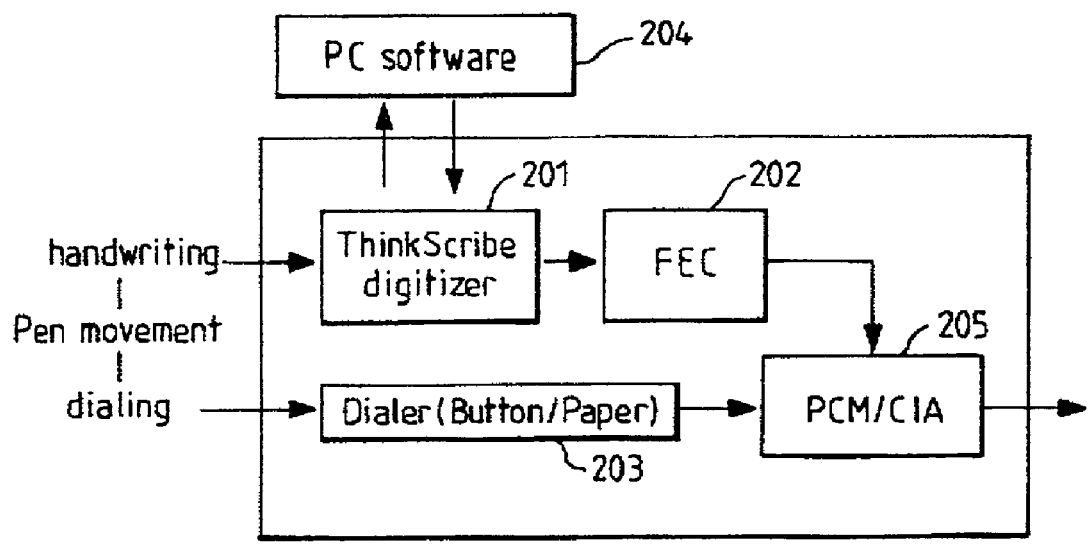
FIG. 2 is a block diagram of a portable fax machine with a pen-based input device according to an embodiment of the invention.

The following descriptions in connection with FIG. 2 illustrate in detail, the internal structure of the portable fax machine with a pen-based input device according the present invention:

As shown in FIG. 2, the portable fax machine according to an embodiment of the present invention comprises: a handwriting digitizer 201 of ThinkScribe, a fax encoder 202, dialing means 203, PC software interface 204 and fax transmitting means 205 (provided in the drawing as PCMCIA card). ThinkScribe being pen-based input means of the portable fax machine, a user can write fax documents to be transmitted with said means. ThinkScribe records and stores the data representative of strokes and related events. The function of the fax encoder is to convert the ThinkScribe data format to G3 standard fax format. The dialing means is used for inputting the number of the fax destination to set up the connection with the fax destination. The PC software interface 204 is used for communicating with PC to archive the fax documents and to accept the fax template defined by a user. The function of fax transmitting means is to transmit the documents in the standard fax data format outputted from the encoding means 202 to the fax destination.

Figure 3:
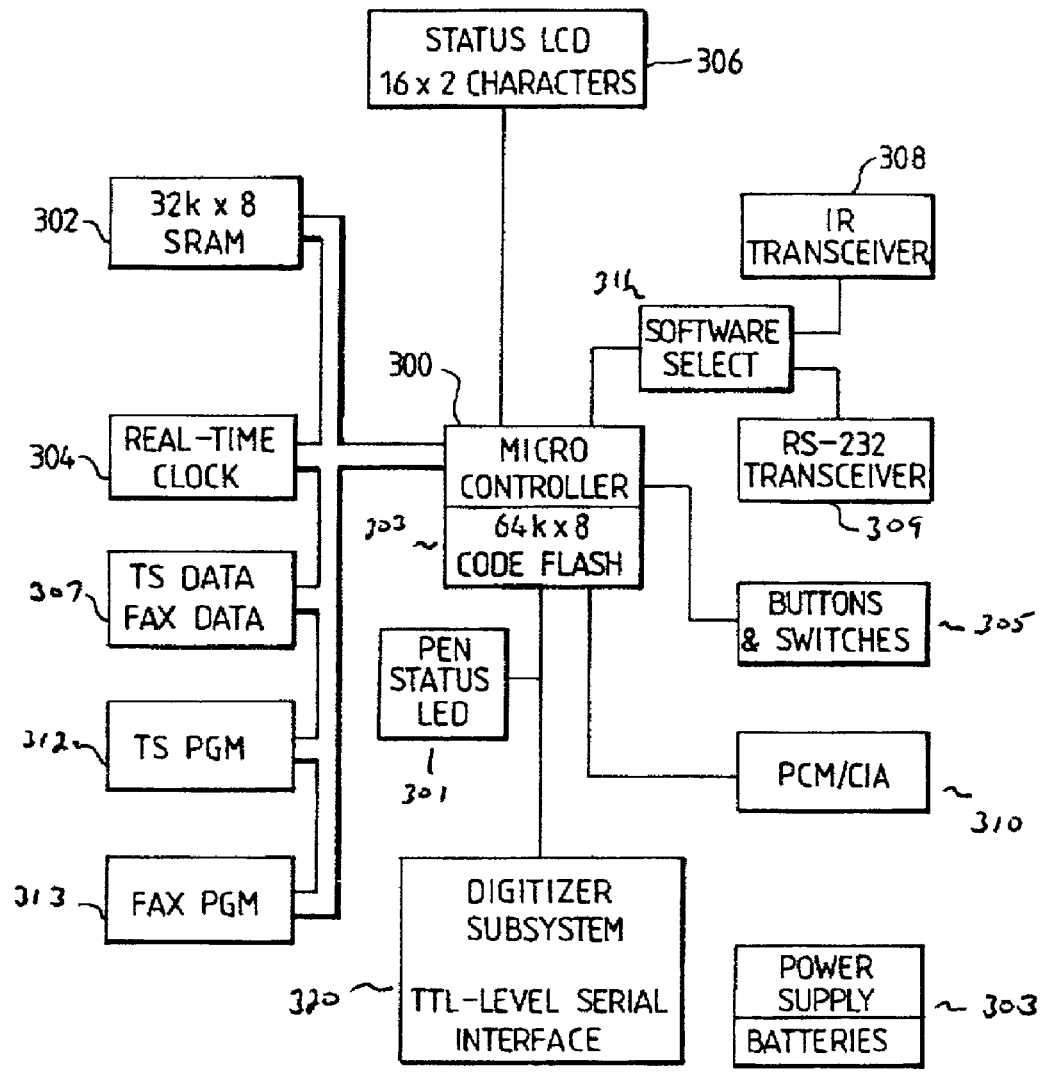
FIG. 3 is a block diagram of the hardware components of a portable fax machine with a pen-based input device according to an embodiment of the invention.

FIG. 3 describes the composition of the hardware of the portable fax machine with a pen-base input device according to an embodiment of the invention. The whole fax machine is managed by micro controller 300, with the aid of a real-time clock 304. The controller 300 is coupled to volatile and nonvolatile memory 302 and 303, a display 306 and output devices 308 and 309. The output device, in the embodiment of the present invention, may comprise a RS-232 serial port, IR transceiver 308 and/or a PCMCIA fax card 310 for interfacing with other systems. The microcontroller 300 is further coupled to a digitizer subsystem 320. By using software (or firmware) stored in the nonvolatile memory 303, the micro-controller 300 manages the operations of other components, for instance, instructing the memories (300 and 303) to store the data stream reflecting the strokes and related event, instructing the fax encoder 313 to convert the Thinkscribe data 307 stream to standard G3 fax format, instructing the serial port RS-232 to set up the connection with a PC (not shown), accepting from PC the fax template defined by a user and transmitting the ThinkScribe data 307 stream stored in the nonvolatile memory 303 to a PC (not shown) so as to perform further processes on the same. As understood by a person skilled in the art, the buttons and switches 305 control powering of the device from the power supplies 303 as well as selected user functions. Further, the nonvolatile memory comprises RAM and EPROM. The data recording, storing, converting and transmitting functions can be performed by either the software in RAM 302 or the firmware in EPROM. Thus, the fax encoder of the present invention can be the programs in RAM or EPROM. For the sake of clearness, in FIG. 3, the ThinkScribe program 312, the fax machine program 313 (encoding, data transmitting and PC software receiving) and the TS/FAX data are shown in different blocks.

Figure 4:
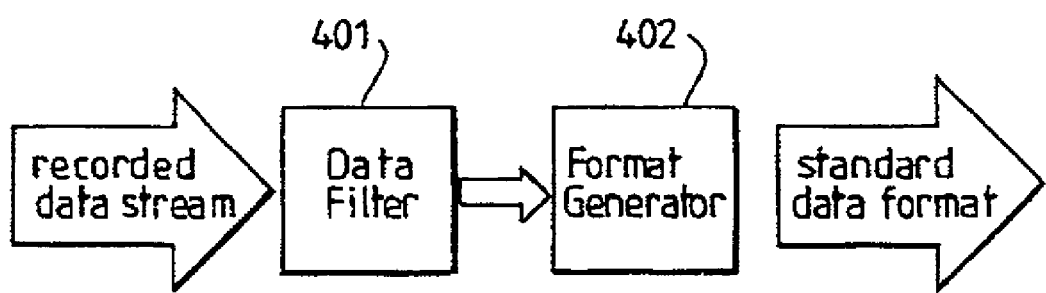
FIG. 4 shows the composition of the fax encoder according to an embodiment of the invention.

The following in connection with FIG. 4, FIG. 5, FIG. 6 and FIG. 7 describes the working condition of the fax encoder of the present invention:

As shown in FIG. 4, the fax encoder of the present invention is composed of a data filter 401 and a format generator 402. The input data of the data filter is the raw data recorded by ThinkScribe. After analyzing the data stream of ThinkScribe, the data filter 401 outputs stroke data used by the format generator to generate standard fax data format.

Figure 5:
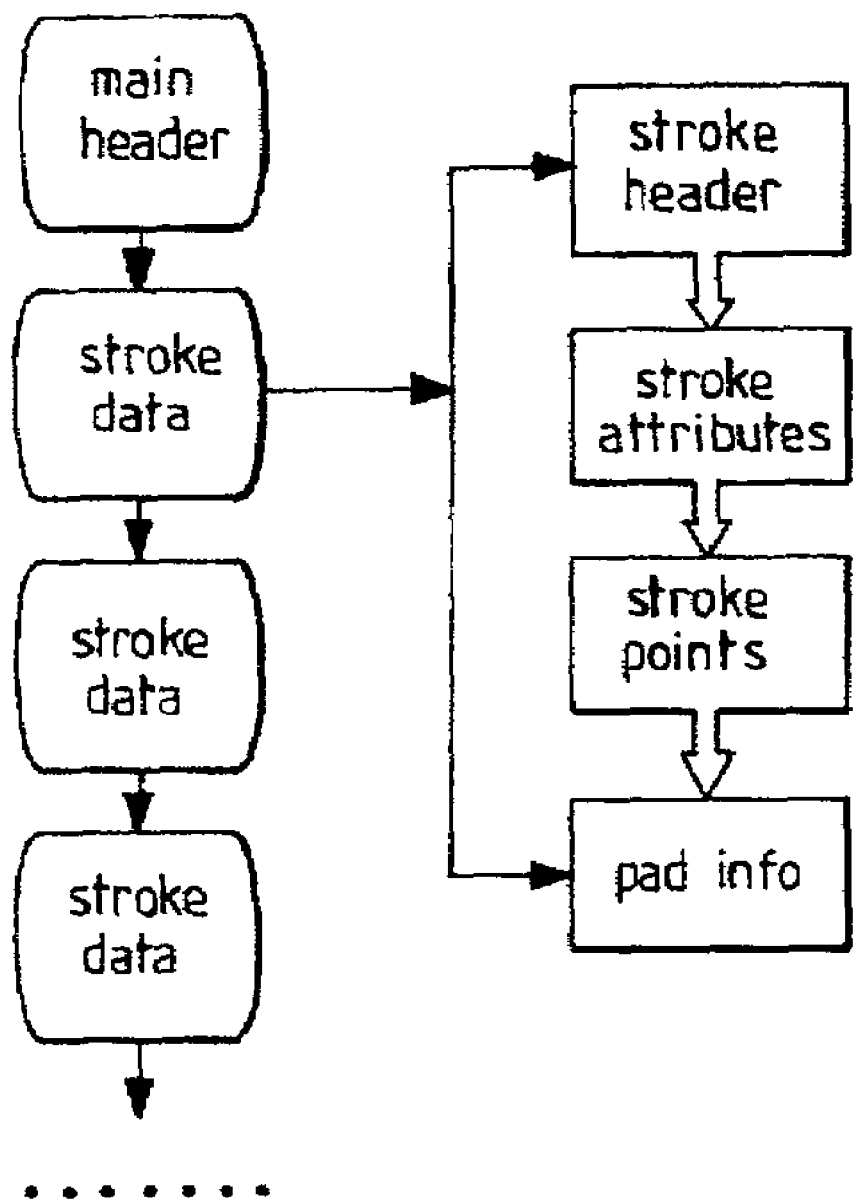
FIGS. 5 and 6 show the working condition the data filter in the fax encoder.
Figure 6:
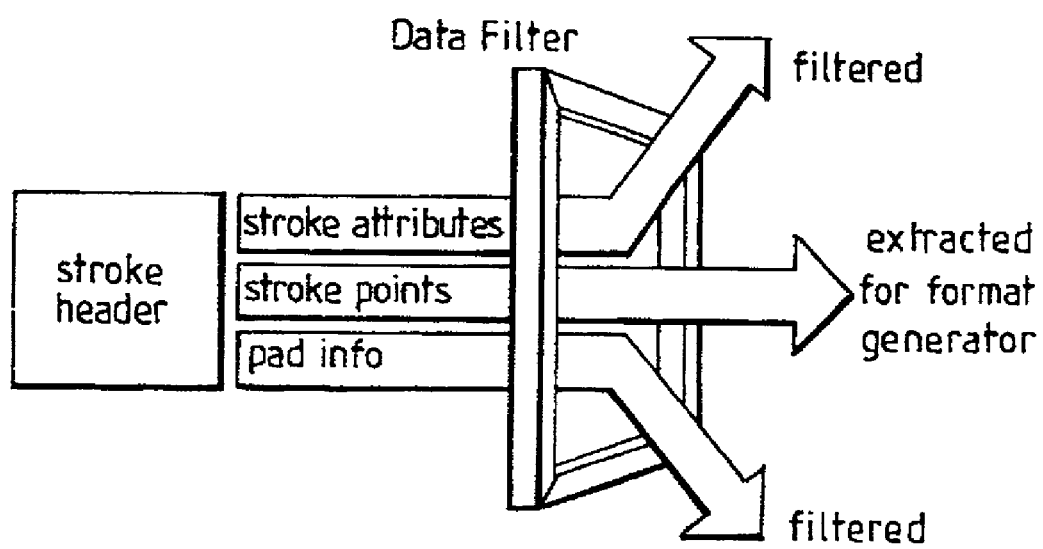

FIG. 5 illustrates the internal data structure of ThinkScribe. Each stroke data package is made up of stroke header, stroke attribute, stroke points and the related digital pad information. Stroke header and stroke attribute give the stroke information such as the beginning time of this stroke and how many points belong to this stroke. Pad information is used for pad identification and can be optional. Stroke points are an array of points data, of which each point is represented by its x and y coordinates. Data filter 401 extracts the points' coordinates from the ThinkScribe data as shown in FIG. 5 for format generator 402 to generate standard fax format data. FIG. 6 illustrates the function of the data filter. As shown in FIG. 6, the stroke attribute, pad information and stroke header are discarded, only the stroke points are kept for the fax format generation.

After receiving the filtered stroke points from the data filter 401, the format generator 402 transforms the point data into standard G3 fax format data, whose coding is a kind of run-length coding method based on the line-resolution of 1728 pixels. The stroke points coming from the data filter have their x and y coordinates. Thus the main function of the format generator is to convert the coordinate data into run-length fax format.

The format generation procedure may be divided into three stages:

I: Interpolation

The standard fax resolution is different from that of ThinkScribe; so the format generator performs interpolation to transfer the coordinates of points on ThinkScribe to those of points on Fax in order to meet resolution requirement of fax format. The interpolation algorithm is as follows:

For each point detected by ThinkScribe with coordinates (x, y), this algorithm transforms this point to that with (x', y') on Fax page.

(1) Mapping from ThinkScribe page to Fax page:

Suppose the size of ThinkScribe page is X pixels by Y pixels, and the size of Fax is X' pixels by Y' pixels. The following relationship between the (x, y) and (x', y') can be used to describe the transformation from ThinkScribe page to Fax page:

$$x'=(x'/x)x \quad y'=(y'/y)y$$

(2) Interpolation:

For two points detected by ThinkScribe with coordinates $(x_1, y_1)$ and $(x_2, y_2)$, the corresponding points on Fax page $(x_1', y_1')$ and $(x_2', y_2')$ are calculated with (a).

i) If $y_1'=y_2'$ if $x_1'=x_2'$, $(x_1', y_1')$ and $(x_2', y_2')$ are the same point on Fax page;

if $x_1' \neq x_2'$, insert the points between $(x_1', y_1')$ and $(x_2', y_2')$ in the horizontal line with $y'=y_1'$ ii) if $x_1'=x_2'$ if $y_1'=y_2'$, $(x_1', y_1')$ and $(x_2', y_2')$ are the same point on Fax page:

if $y_1' \neq y_2'$, insert the points between $(x_1', y_1')$ and $(x_2', y_2')$ in the vertical line with $x'=x1'$ iii) if $x_1' \neq x_2'$ and $y_1' \neq y_2'$, insert the points between $(x_1', y_1')$ and $(x_2', y_2')$ in the line with $$((y_1-y_2)/(x_1-x_2))=((y_1-y)/(x_1-x))$$

II: sorting

After interpolation, coordinate sorting is performed. All the stroke points on Fax page are sorted first by their Y coordinates, then by their X coordinates. After this sorting stage, stroke points are collocated in a two-dimension array from left point to right point, and from top line to bottom line.

III: encoding

After sorting, the point data is ready for transformation. RLE is a data/image coding algorithm, which compresses the data/image using the characteristic that the gray or color difference of pixels is very little in a local area of the image. That is, the pixel sequence of the scanning line, $x_1, x_2 \ldots xn$ is mapped into the pair sequence (G1, L1), (G2, L2), ... (Gk, Lk), where Gk represents gray scale, Lk represents the run length of the kth running (i.e., the number of the pixels with the gray scale Gk). For a fax page, what needs to do is only to check every white or black pixel, and compute the run length of two pixels. This method is time-consuming and does not take advantage of the ThinkScribe's data structure.

Because all the points have already been sorted in Stage 2, this encoding procedure can batch-process the blank lines between non-blank lines, which means encoding several blank lines at one time. This algorithms takes advantage of the stroke point data and can greatly save the encoding time.

Figure 7:
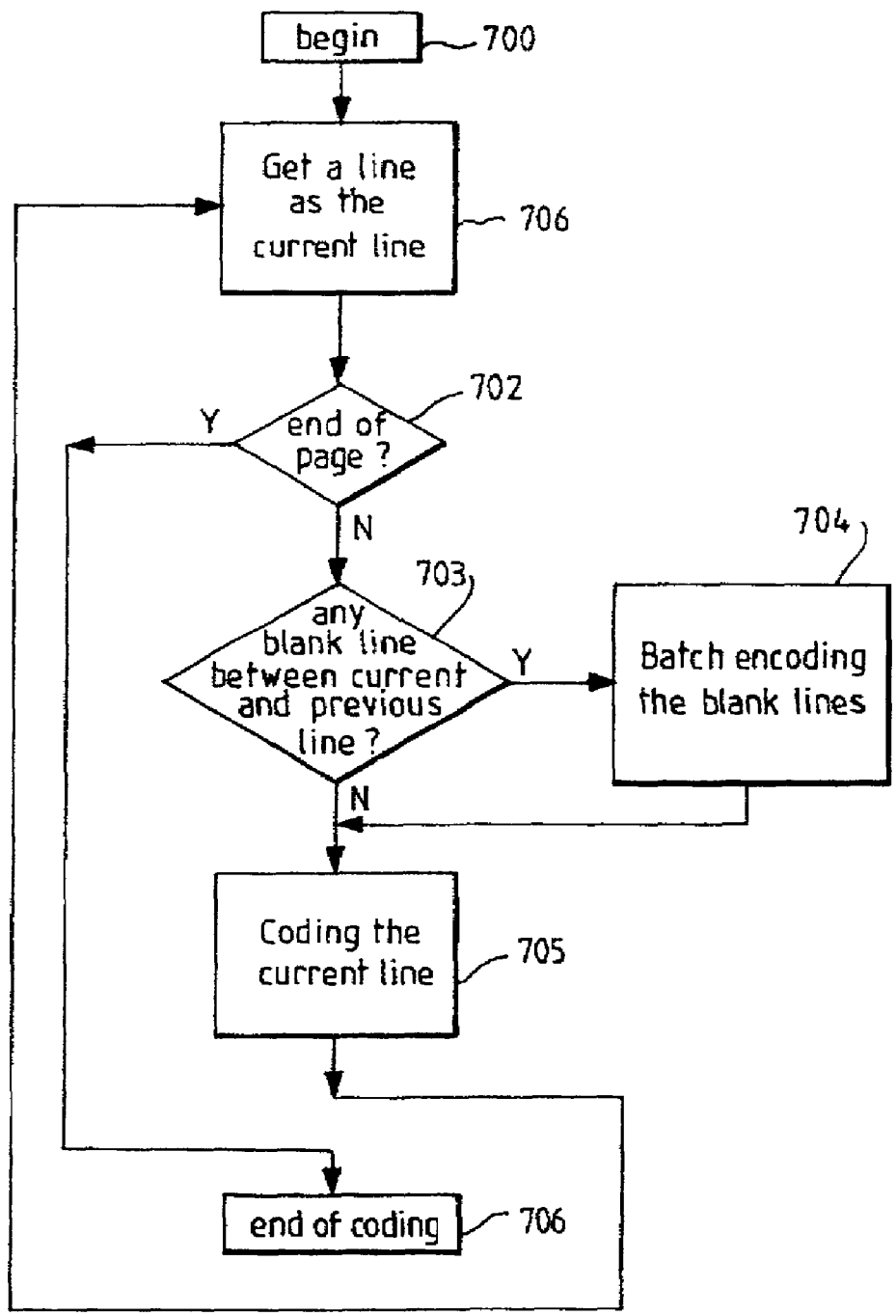
FIG. 7 shows the working condition of the format generator in the fax encoder.

FIG. 7 describes the steps of the encoding method. Step 702 determines whether it is the end of a page. If the answer is Yes, step 706 terminates the encoding procedure. Otherwise, step 703 determine whether there are blank lines between the current line and the last line. If the answer is Yes, step 704 batch-processes the blank lines, i.e., encoding many lines at one time. Otherwise, step 705 encodes the current line.

The above in connection with the drawings illustrates the working condition of the fax encoder of the present invention with reference to the ThinkScribe data structure. As understood by a person skilled in the art, the above is only an example. The fax encoder of the present invention can be used for different data structure for recording the moving trace of the stylus on the digital pad.

Figure 8:
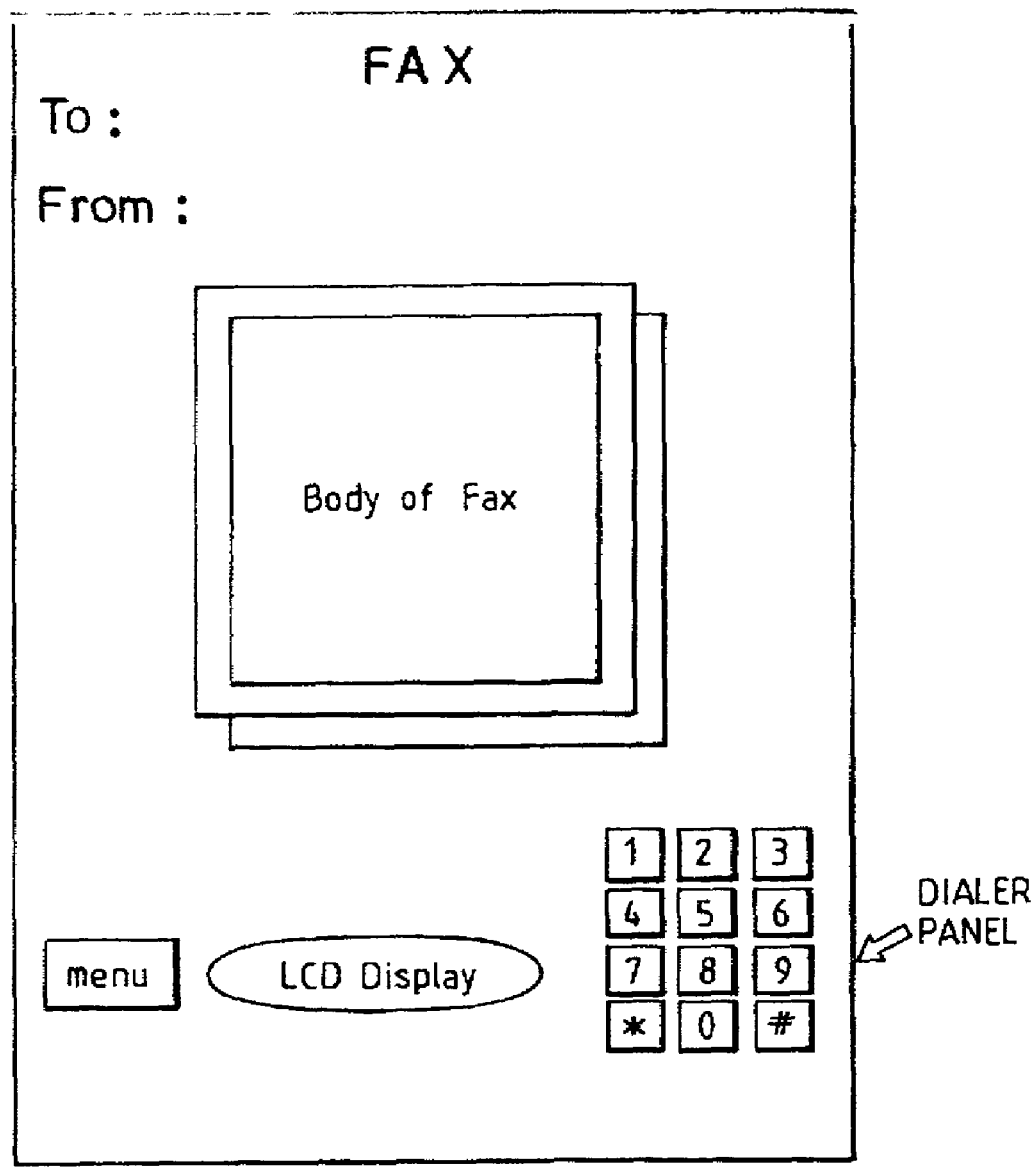
FIG. 8 shows the dialer of a portable fax machine according to an embodiment of the invention.
Figure 9:
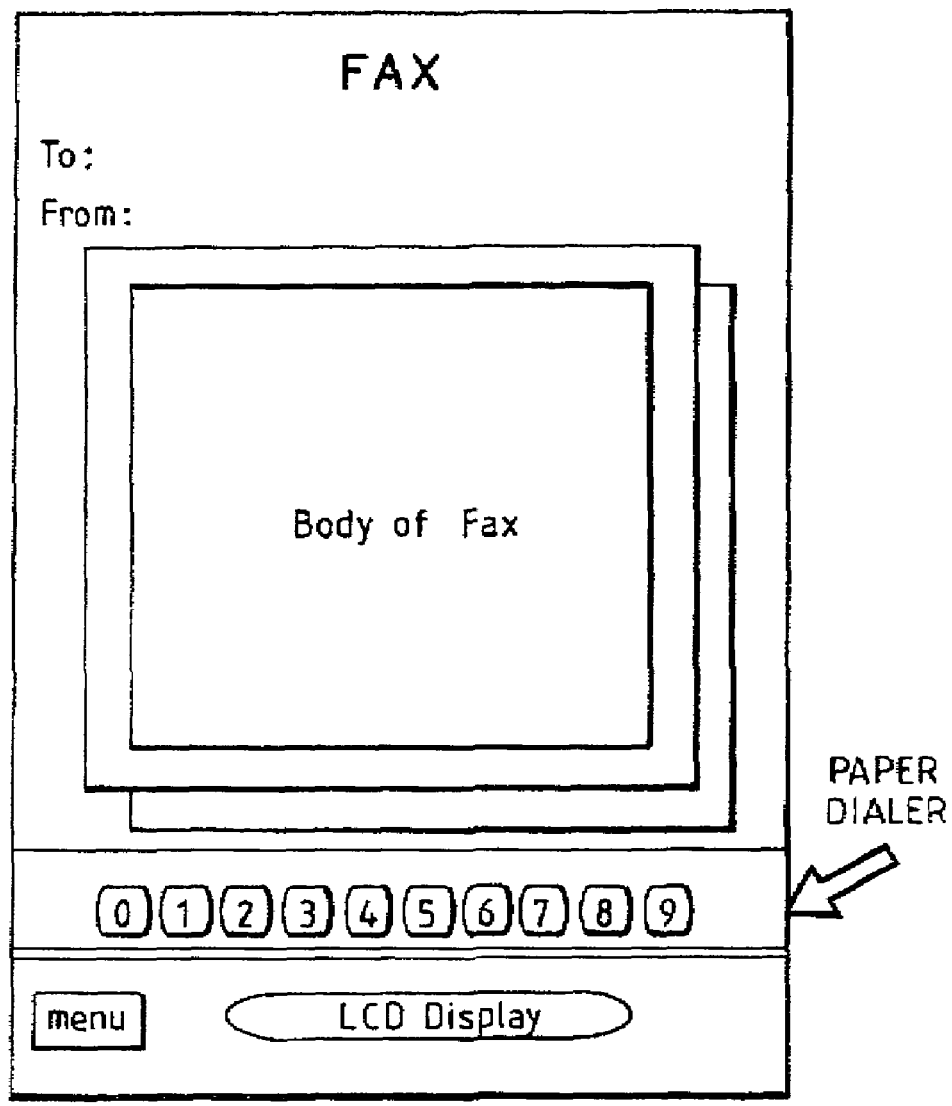
FIG. 9 shows the dialer of a portable fax machine according to another embodiment of the invention.

The following in connection with FIGS. 8 and 9 illustrates the dialing means of the portable fax machine according to an embodiment of the present invention. As shown in FIG. 8, according to an embodiment, a dialing keyboard is used as the dialing means. The dialing keyboard is made up of ten buttons on the housing 102 representative of ten digits (0–9). After selecting the dialing command displayed in the main menu on the LCD display of ThinkScribe, a user can touch these buttons to dial the number of the fax destination. A user can also select the number of fax destination directly from the LCD display. When a user touches the digital pad with the stylus, the micro-controller will identify whether the received signals are from the button area or the writing area. If the signals are from the writing area, the data stream reflecting the strokes and related events is stored in the nonvolatile memory. If the detected signals are from the button area, the information from these buttons will be sent to PCMCIA card as dialing sequence. In such a case, the positions of the dialing buttons are fixed.

FIG. 9 shows the dialing means according to another embodiment of the present invention—a so-called "paper dialer". A user can freely define an area within the input device's display area to be the dialing area. Concretely, a user can select an area on the input device display area, which corresponds to a region of a document page or image page to be faxed or which is adjacent the fax page display area, to display boxes or buttons representative of digits 0–9. The definition of the dialing area and the signals generated in response to user interaction with the dialing area can be processed by software within a personal computer. In order to let the user be aware of the position of the dialing area, a blank page of the predefined check boxes representative of digits 0–9 can be printed out. Then, when the software is downloaded from PC to the fax machine, a user can directly use said dialing area to set up the connection with the fax destination. Thus, the so-called paper dialing is realized. The advantages of adopting the paper dialing is that the cost for modifying the hardware of the pen-based device can be reduced. Meanwhile, since the position of the dialing area can be defined by the software of the PC, paper dialing is more flexible than dialing keyboard.

The following describes the function of the PC interface 204. The main purpose of setting this interface is to facilitate the downloading of software package from PC so as to archive fax documents and accepting template defined by a user.

The data stream of ThinkScribe reflects the stroke points written by a user on the pad and the related timing information. With the timing information of each fax, a user can sort their outgoing fax by time. And with the fax number information of each fax, a user can also archive fax documents.

Another advantage of the file archiving function is the small size of the file. The average size of one page TS data is only about 20K bytes whereas the average size for the corresponding bit map file is about 200–400K.

In addition, with this PC software package, a user can predefine fax templates then download to the fax machine. For instance, one can add information of sender such as company name, person name and company label to a predefined template. A paper dialer can also be added to the template. A user can print out the predefined fax template as the blank page and compose the fax content on the portable fax-machine later. The handwritten content and predefined user template will be combined together for delivering.

The above in connection with the drawings illustrates the concrete examples of the present invention. As understood by a person skilled in the art, under the premise that the spirits and scope of the present invention are not violated, various changes can be made to the above examples.

What is claimed is:

1. A portable fax machine, comprising:
   a pen-based input device, comprising a writing pen and a writing pad, enabling a user to write documents for fax transmission on the writing pad by means of the writing pen, wherein said input device is capable of generating data representative of the moving trace of the pen-based input device and of recording a user's written input in a strokes data format, each stroke comprising a series of position coordinates of pen-based input device between a pen-down event and a pen-up event;
   an encoder for transferring the stroke format data representative of the moving trace of the writing pen into fax data format, said encoder comprising:
      a data filter filtering the data generated by the pen-based input device to extract the stroke data represented by x and y coordinates, and a format generator transferring the stroke data into data in the standard fax data fonnat by interpolating, sorting and encoding and wherein said format generator batch processes blank lines between non-blank lines during the encoding procedure;

a dialer for inputting the fax number of a destination to set up a connection herewith; and a fax transmission device for transmitting to the destination the data in the fax data format output from the encoding means.

2. A portable fax machine according to claim 1, wherein said pen-based input device is a general handwriting digitizer.

3. A portable fax machine according to claim 1, wherein said pen-based input device is a device integrating a handwriting digitizer with a traditional paper-based record making system.

4. A portable fax machine according to claim 1, wherein said dialing means is provided in the writing pad in the form of a software-defined dialing area comprising selectable buttons displayed in a GUI in the writing pad and program code responsive to selection of one of said buttons by the writing pen.

5. A portable fax machine according to claim 1, further comprising a PC software interface for archiving the fax documents and accepting a fax template defined by the user.

6. A portable fax machine according to claim 1, wherein said dialing means is provided in the writing pad in the form of a keyboard.

7. A computer system comprising:

a pen-based input device, comprising a writing pen and a writing pad, enabling a user to write documents for fax transmission on the writing pad by means of the writing pen, wherein said input device is capable of generating data representative of the moving trace of the pen-based input device and of recording a user's written input in a strokes data format, each stroke comprising a series of position coordinates of pen-based input device between a pen-down event and a pen-up event;

an encoder for transferring the stroke format data representative of the moving trace of the writing pen into fax data format, said encoder comprising:

a data filter filtering the data generated by the pen-based input device to extract the stroke data represented by x and y coordinates, and a format generator transferring the stroke data into data in the standard fax data format by interpolating, sorting and encoding and wherein said format generator batch processes blank Lines between non-blank lines during the encoding procedure;

a dialer for inputting the fax number of a destination to set up a connection herewith; and a fax transmission device for transmitting to the destination the data in the fax data format output from the encoding means.

* * * * *